April 5, 1927.
J. C. TAPP
GAUGE
Filed July 9, 1926
1,623,643
2 Sheets-Sheet 1
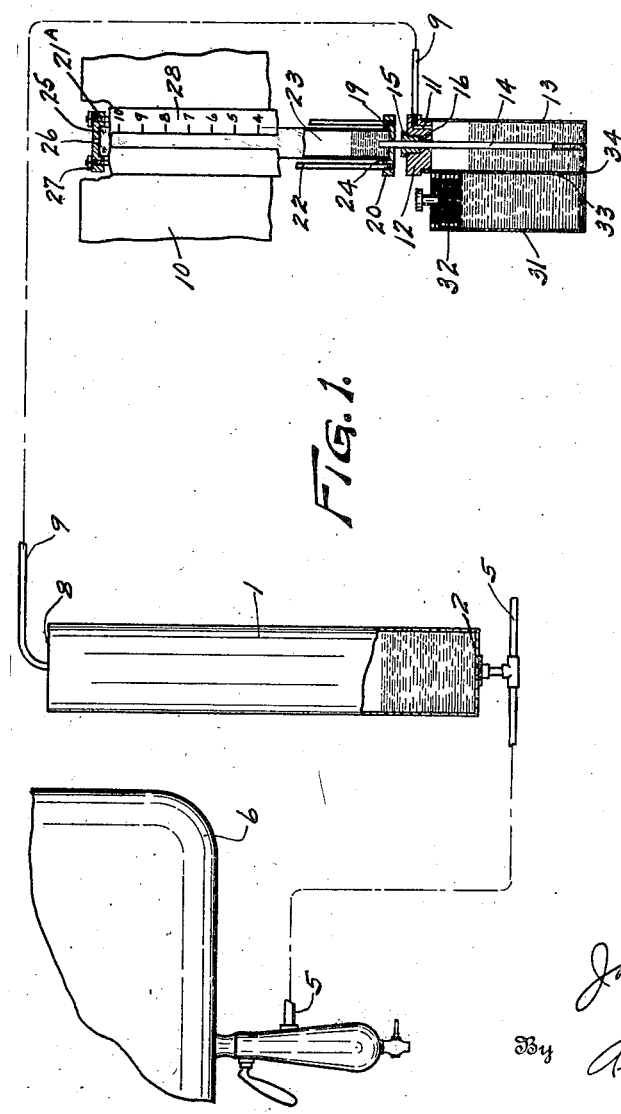
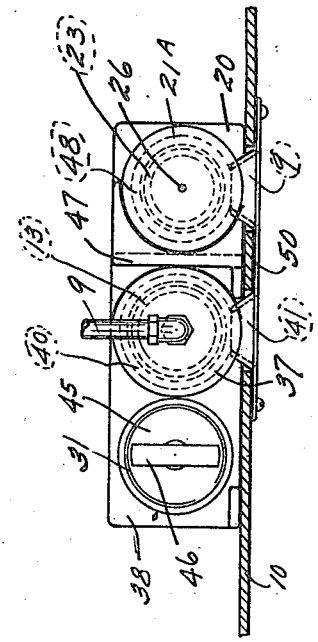
Inventor
John C. Tapp.
By Adam E. Fisher.
Attorney

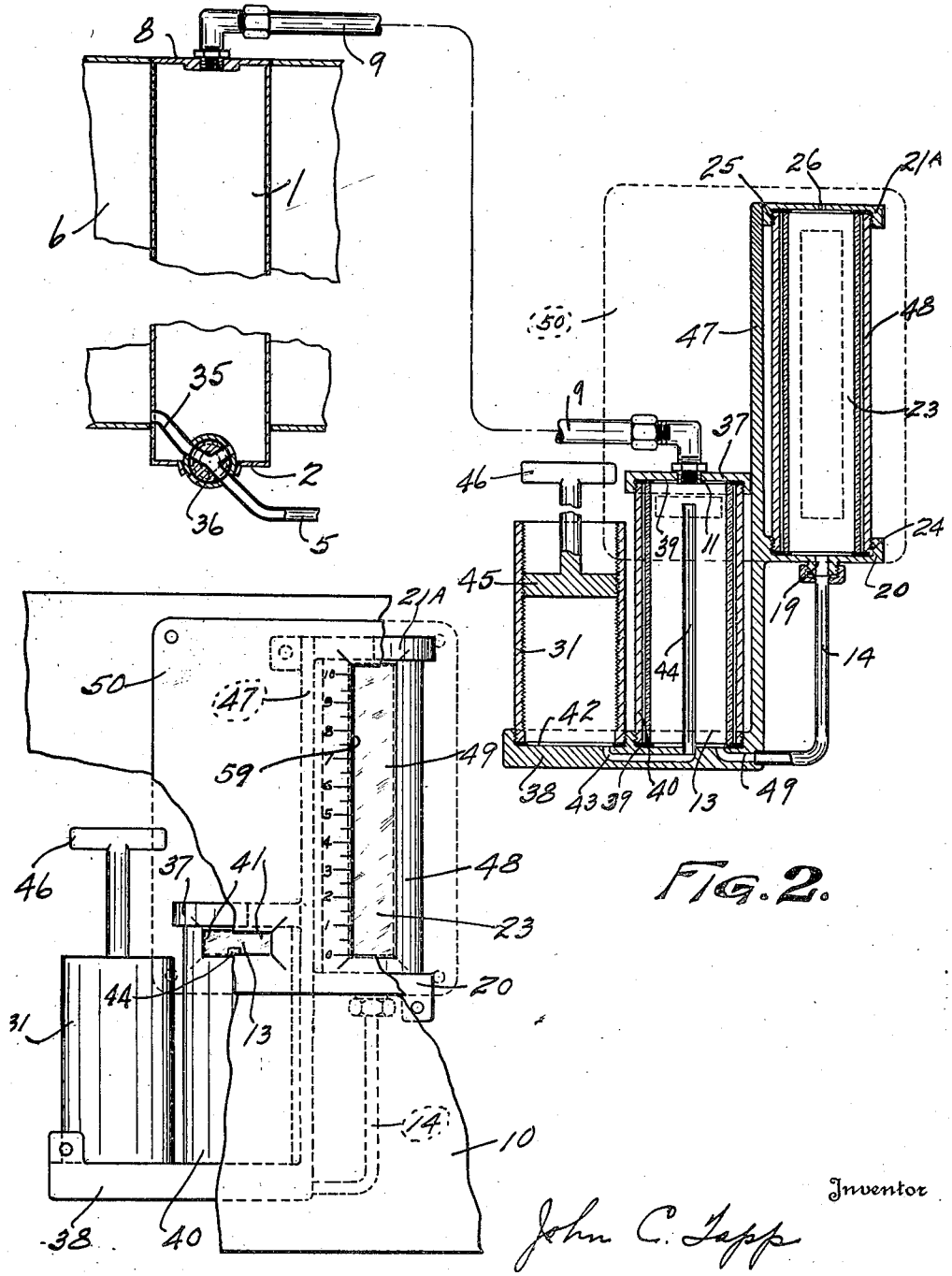

Patented Apr. 5, 1927.

1,623,643

UNITED STATES PATENT OFFICE.

JOHN C. TAPP, OF BROOMFIELD, COLORADO.

GAUGE.

Application filed July 9, 1926. Serial No. 121,316.

This invention relates to improvements on a gauge for measuring the level of a liquid in a container and more particularly to a gasoline gauge of a type commonly used on automobiles as described by me in the application filed August 22, 1924, and distinguished by Serial No. 733,574.

The general object of the invention is a gauge which is simple in construction and operation and can be installed at a low cost.

For a full understanding of the invention and its mode of operation I make reference to the accompanying drawing and specification, in which:

Figure 1 is a combination of several of the views of my above mentioned application parts of which are shown in section.

Figure 2 is a sectional view of my invention as mounted in the liquid container and on the instrument board having the improvements over my original application embodied therein.

Figure 3 is an elevation of the gauge as mounted upon the instrument board.

Figure 4 is a top plan view of the gauge and the several liquid containers.

For the purpose of more clearly describing the improvements of my present application reference is had to my aforementioned application of which the following is a short description.

1 represents the pressure cylinder of my hydrostatic measuring and indicating gauge. The cylinder 1 is connected at its bottom 2 to the supply pipe 5, while at the top 8 it is connected by means of a pipe 9 to the instrument board 10. The position of the cylinder 1 relatively to the tank 6 is so chosen that so long as there is any gasoline in the tank, there is a hydrostatic pressure tending to force gasoline into the cylinder 1, the top of the cylinder 1 being disposed a substantial distance above the bottom of the tank 6. Thus the level of gasoline in the cylinder 1 will rise and fall in proportion to the amount of liquid in the tank and the air or gas in the cylinder will be under a pressure proportionate thereto.

The pipe or air line 9 is connected to the inlet 11 of a container 13 which is in communication at its bottom with an additional container 31. The container 31 is provided with a closure, preferably in the form of a plug 32 adapted to be displaced in vertical direction. To this end, the plug may be screw-threaded to co-operate with a similar screw thread on the interior of the container 31.

The inlet 11 into the container 13 is preferably effected through a stopper or cap 12 through which also extends a pipe 14 from near the bottom of the container upwardly into the gauge tube 23. The pipe 14 may be sealed against ingress of air by means of a packing gland 15, including suitable packing material in the recess 16.

The gauge glass 23 is preferably set into corresponding recesses 24 and 25 in blocks 20 and 21ᴬ interconnected by rods 22 which make screw-threaded engagement with one of the blocks, as for instance, the bottom block 20 and provided with nuts 27 at the other end for drawing the blocks toward each other upon the glass. In the top block 21ᴬ is provided a vent hole 26 thru which air may pass into and out of the glass tube 23. The pipe 14 extends thru a perforation 19 in the block 20. I preferably provide the container 13 and 31 as an integral unit with a common partition wall 33 providing the communication 34. The tube 23 is set behind and exposed through the slot of a scale 28 graduated in suitable units. The scale is attached to the instrument board by means of screws, while the gauge may be supported on the scale by means of screws extending into the blocks 20 and 21ᴬ.

In my improved gauge covered by the present application the improvements will be numbered consecutively starting with the reference numeral 35.

In carrying out these improvements I mount the cylinder 1 within the container 6 and provide the same with an inlet spout 35 mounted in the inner lower portion thereof and communicating with the inside of the said container 6 near the bottom. The bottom portion 2 of the said cylinder 1 is provided with a two-way valve 36 which communicates with the said container 6 thru the spout 35. One of the said valve openings communicates with the interior of the cylinder 1 while the other opening communicates with the supply pipe 5 which connects with the carburetor (not shown). The upper end 8 of the cylinder 1 is connected to a pipe 9 the opposite end of which engages a cap 37 which serves to close the container 13 which in this instance is preferably made of glass. A base 38 is provided and has the container 13 mounted thereon. Gaskets 39 are provided on either end of the said container 13.

The said gaskets 39 seal the ends of the container 13 thru the medium of a tube 40 which is pierced with a sight slot 41 and threaded at its ends into the base 38 and cap 37. The reservoir container 31, in this instance, is constructed in the form of a tube which is formed independent of the container 13 or tube 40 which encloses the same, and is threaded into the base 38 and onto a gasket 42 adapted for sealing the said container 31 against leakage thru its threaded joint with the said base 38. A passageway 43 is formed in the base 38 and communicates with the interior of the container 31 and a tube 44 located in the said container 13 for supplying the said container 13 with a liquid, the use of which will be later explained. A plug 45 formed with a handle 46 threadedly engages the interior of the said container 31. A gauge plate 47 is cast integrally with the base 38. The gauge glass 23 is mounted between the blocks 20 and 21ᴬ which are secured to the gauge plate 47. The said gauge glass 23 is provided with gaskets at each end which are located in the recesses 24 and 25. The said blocks 20 and 21ᴬ are further connected by means of a tube 48 pierced with a sight aperture 49 which is mounted over the said gauge glass 23 for protection, as well as forming a leak-proof joint between the said gauge glass and the blocks 20 and 21ᴬ. The said block 21ᴬ is provided with a vent hole 26 thru which air may pass into and out of the said gauge glass 23. The block 20 is provided with a perforation 19 thru which the pipe 14 communicates at its one end with the gauge glass 23. The opposite end of the said pipe 14 communicates with the container 13 by means of a passageway 49 formed in the base 38. A face plate 50 is mounted upon the dashboard (not shown) over the tubes 48 and 40 to finish off the appearance of the same. The said face plate 50 is pierced with the sight slots 59 and 41.

In use, the gauge 23 with its associated containers 13 and 31 is mounted thru the dash-board for the convenience of the driver. The said containers 13 and 31 are filled with a colored non-freezing liquid for the purpose of registering the quantity of liquid in the liquid container 6. According to the amount of gasoline in the container 6 the air pressure in the line 9 will force more or less of the liquid in the container 13 up thru the pipe 14 into the gauge glass 23 so that the level of the liquid will indicate on the scale 28 the amount of the gasoline in the container 6. The plug 45 may be adjusted from time to time to bring the level of the liquid to the correct scale indication shown thru the side slot 41. The inlet spout 35 conveys the gasoline into the two-way valve 36 which distributes it into the cylinder 1 and the carburetor line 5. As the gasoline in the container 6 is used the gasoline in the cylinder 1 drops in proportion, thus reducing the hydrostatic pressure in the line 9 and container 13 and permitting the liquid forced into the gauge 23 to recede into the container 13. The top of the tube 44 stops a little short of the neutral liquid level of the container 13 so that when hydrostatic pressure is applied upon the liquid in the said container 13 there will be no possibility of the liquid receding into the container 31 in a compressed form under the said hydrostatic pressure thereby insuring the more perfect operation of the device.

While I have herein described a certain specific method of constructing and assembling the elements of my invention, it is understood same may be varied in minor details, not departing from the spirit of my invention as defined in the appended claims.

I claim:

1. Apparatus for indicating the amount of gasoline in the supply tank of an automobile, comprising a vessel the bottom of which is disposed a substantial distance below the bottom of the tank and the top of which is disposed a substantial distance above the bottom of the tank, a tube connection between the bottom of the tank and the bottom of the vessel, an indicating tube mounted on the dash board of the automobile, a liquid container adjacent the indicating tube, a reservoir positioned in juxtaposition to said liquid container, a tube connection from the bottom of said liquid container to the bottom of said indicating tube, a tube connection from near the top of said liquid container to the bottom of said reservoir, and a tube connection between said vessel and the top of the liquid container.

2. Apparatus according to claim 1, wherein the tube connection from the bottom of the reservoir to the liquid container comprises a tube communicating with said reservoir and extending medially and upwardly the interior of said liquid container, said tube having its terminus near the top of said liquid container; and a sight slot provided in the walls of said liquid container whereby the terminus of said tube may be observed.

In testimony whereof I affix my signature.

JOHN C. TAPP.